Aug. 19, 1952 W. D. ALLISON 2,607,610
SPRING SUSPENSION FOR MOTOR VEHICLES
Filed Dec. 28, 1946 7 Sheets-Sheet 1
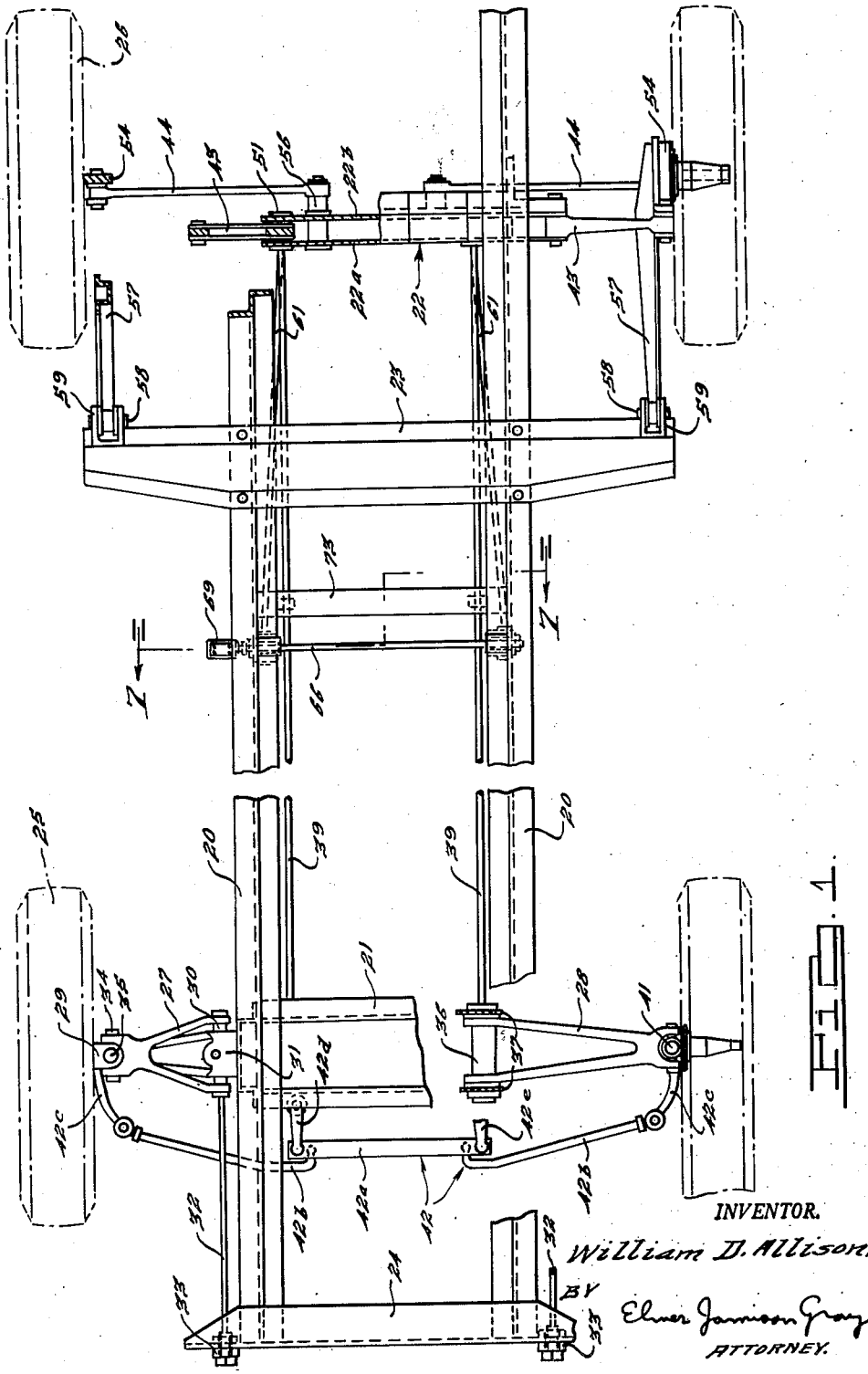
INVENTOR.
William D. Allison.
BY
Elmer Jamison Gray
ATTORNEY.

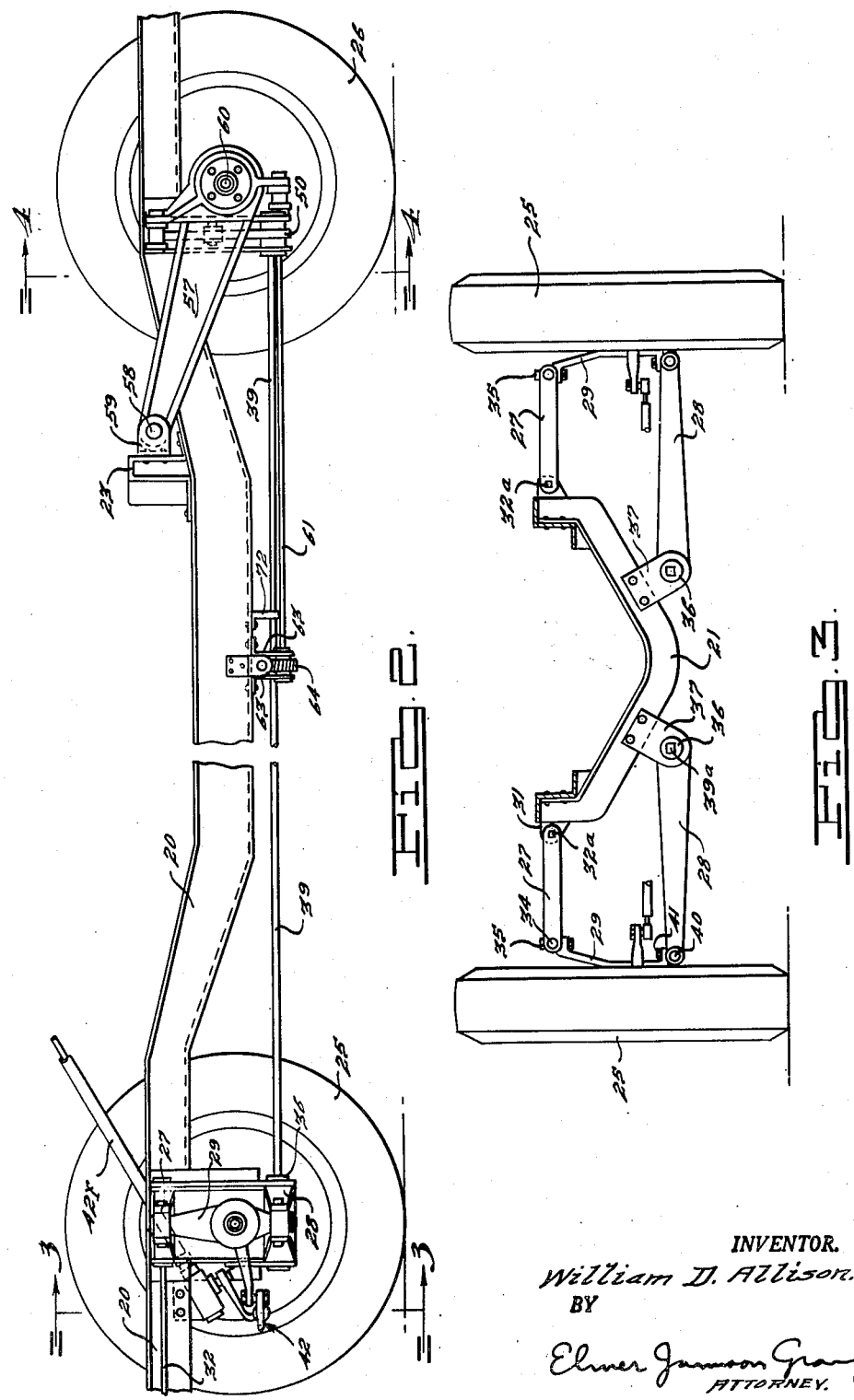

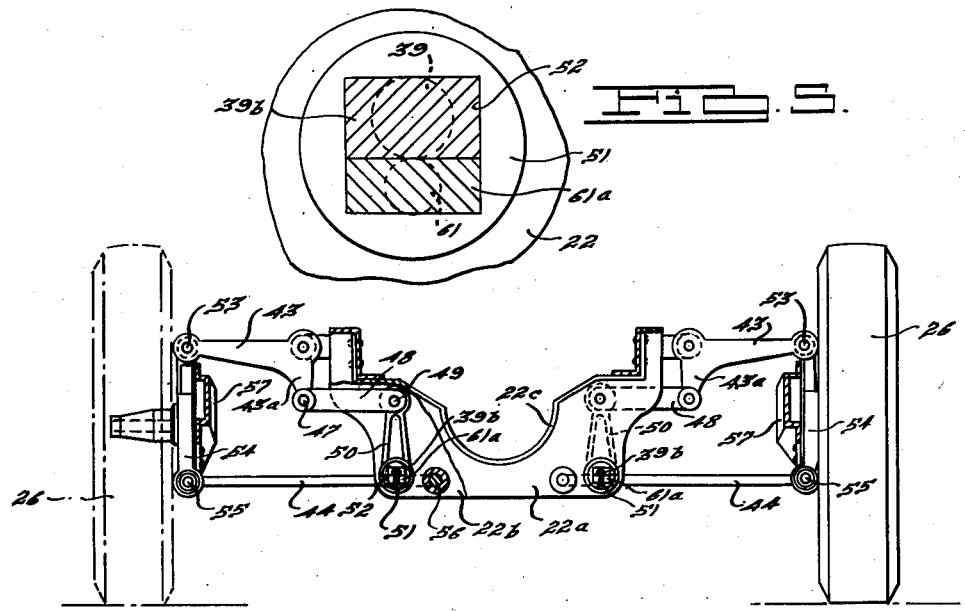
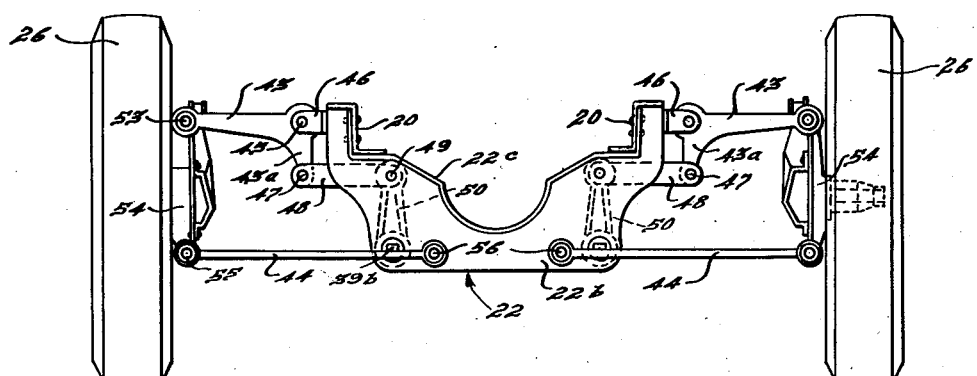

Aug. 19, 1952      W. D. ALLISON      2,607,610
SPRING SUSPENSION FOR MOTOR VEHICLES
Filed Dec. 28, 1946      7 Sheets-Sheet 4
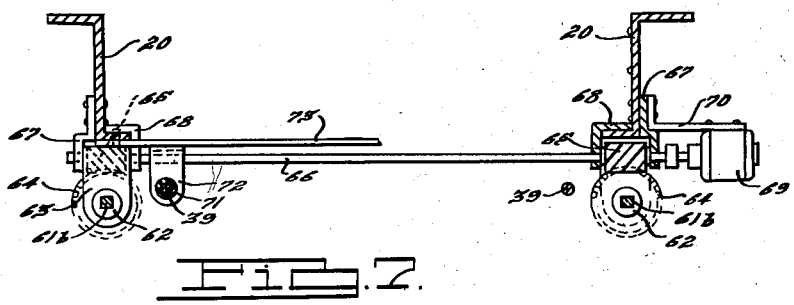
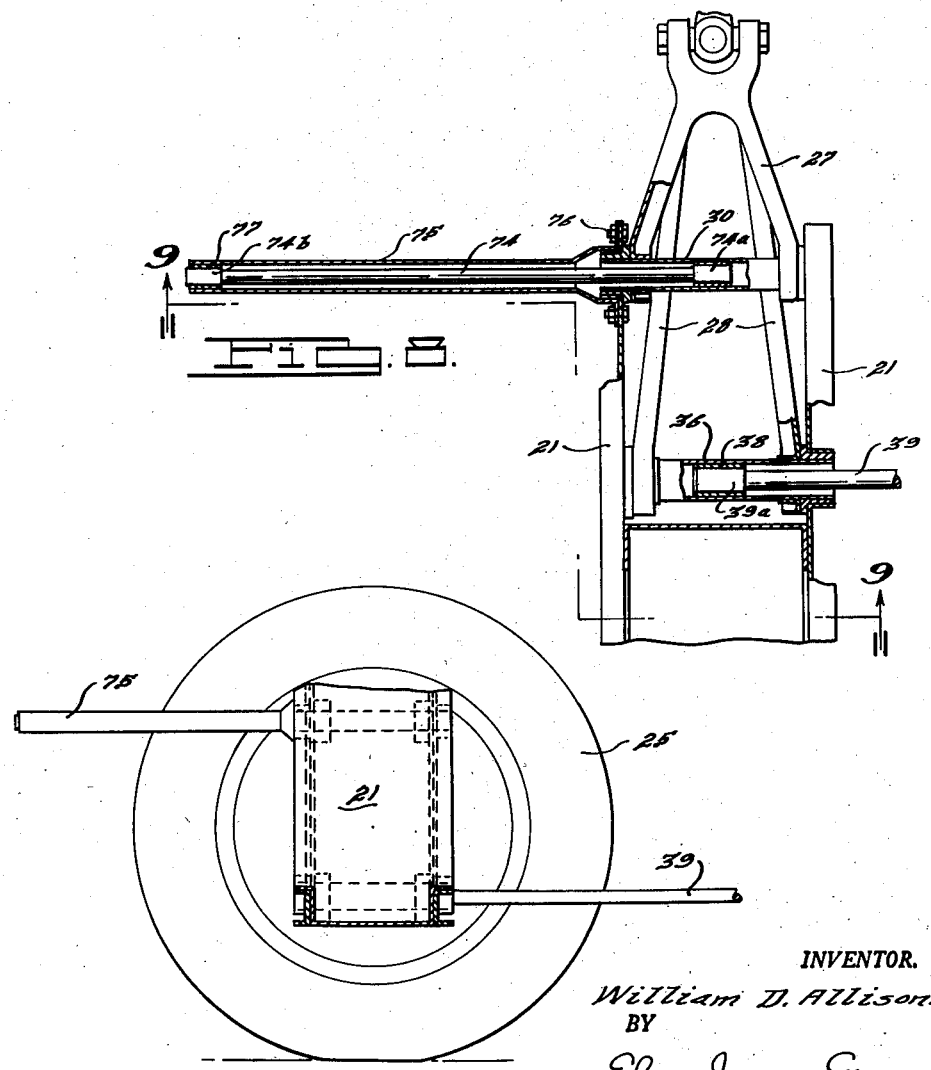
INVENTOR.
William D. Allison.
BY
Elmer Jameson Gray
ATTORNEYS.

Aug. 19, 1952     W. D. ALLISON     2,607,610
SPRING SUSPENSION FOR MOTOR VEHICLES
Filed Dec. 28, 1946     7 Sheets-Sheet 5
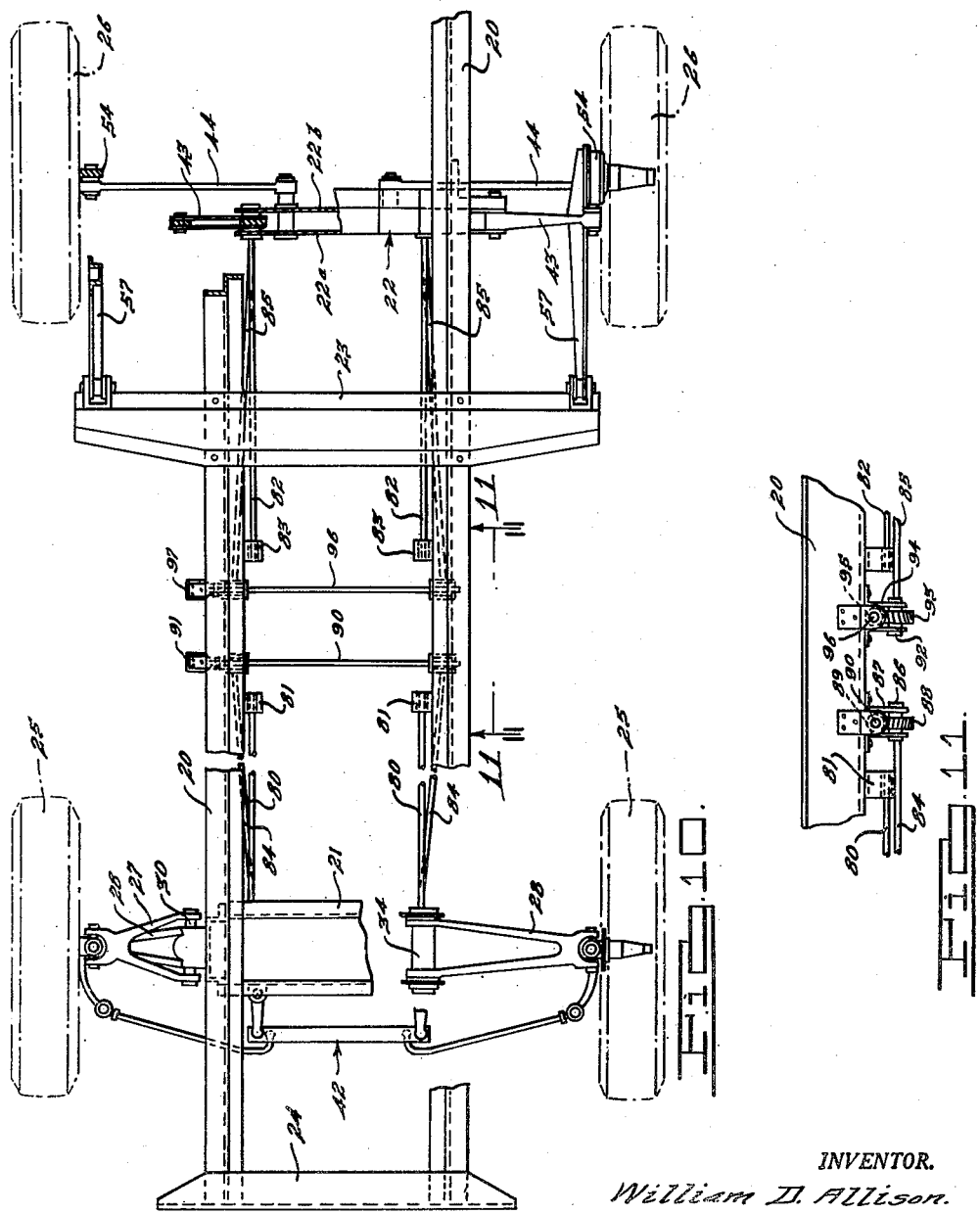
INVENTOR.
William D. Allison.
BY
Elmer Jamison Gray
ATTORNEY.

Aug. 19, 1952  W. D. ALLISON  2,607,610
SPRING SUSPENSION FOR MOTOR VEHICLES
Filed Dec. 28, 1946  7 Sheets-Sheet 6
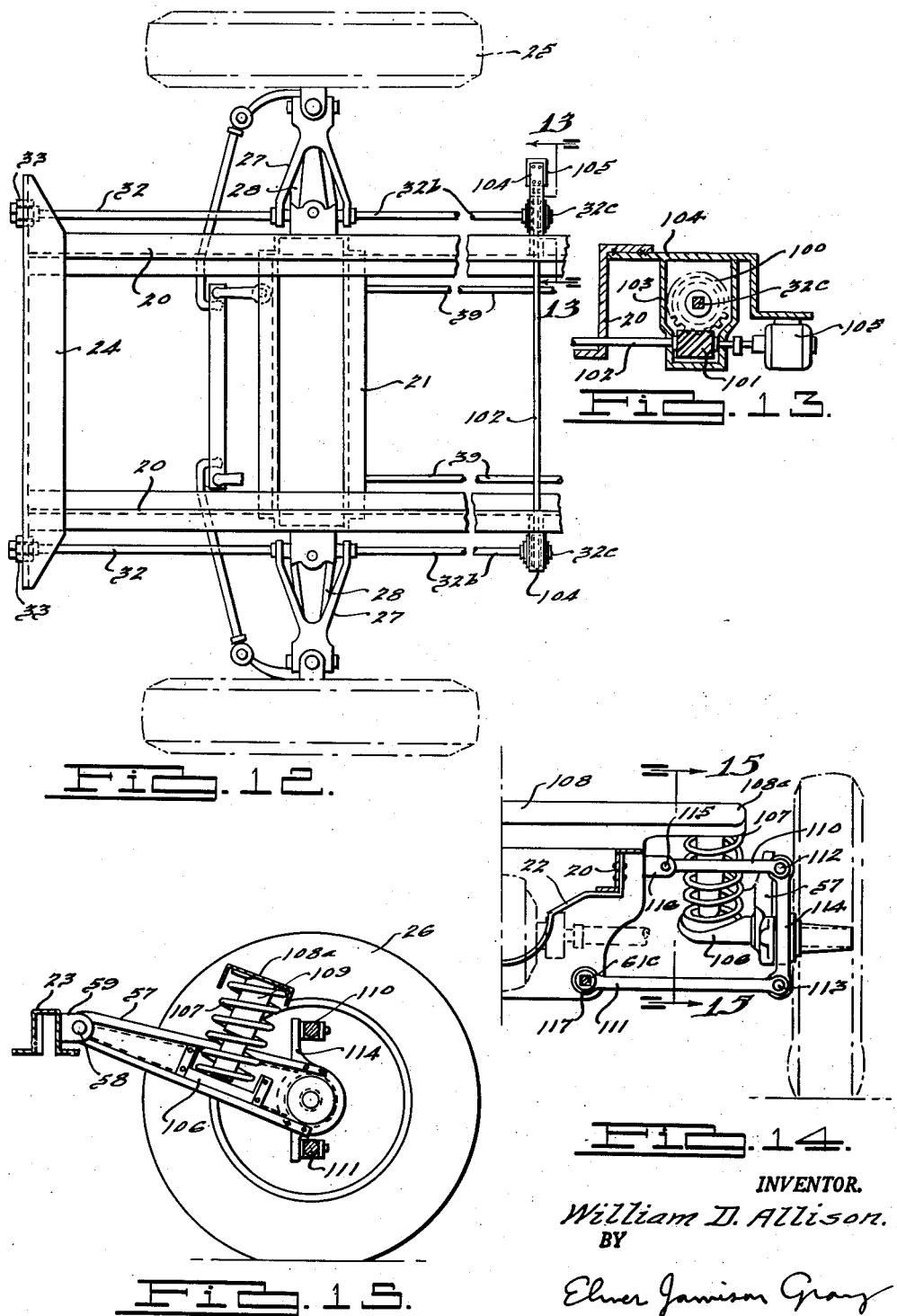
INVENTOR.
William D. Allison.
BY
Elmer Jamison Gray
ATTORNEY.

Aug. 19, 1952 W. D. ALLISON 2,607,610
SPRING SUSPENSION FOR MOTOR VEHICLES
Filed Dec. 28, 1946 7 Sheets-Sheet 7
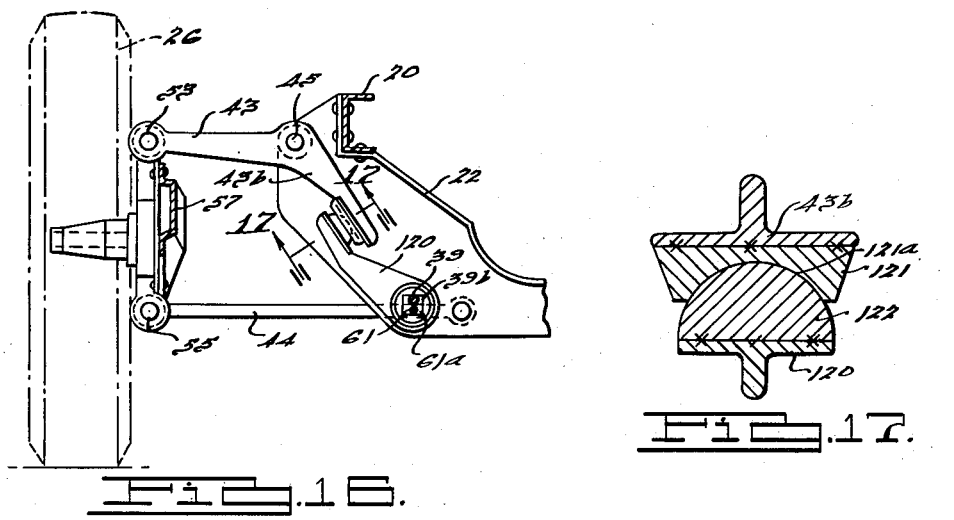
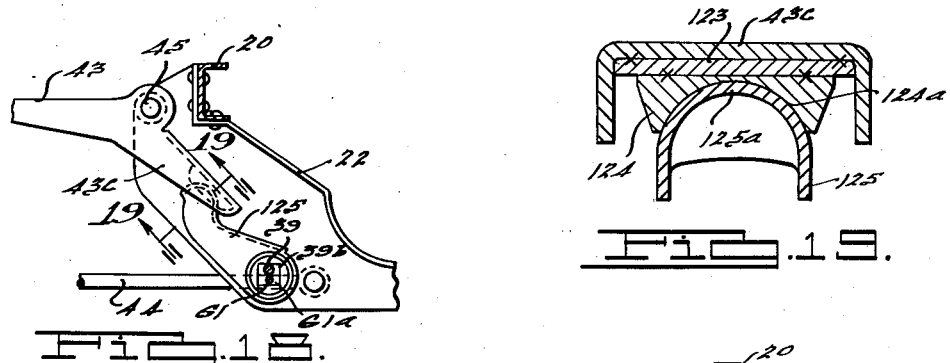
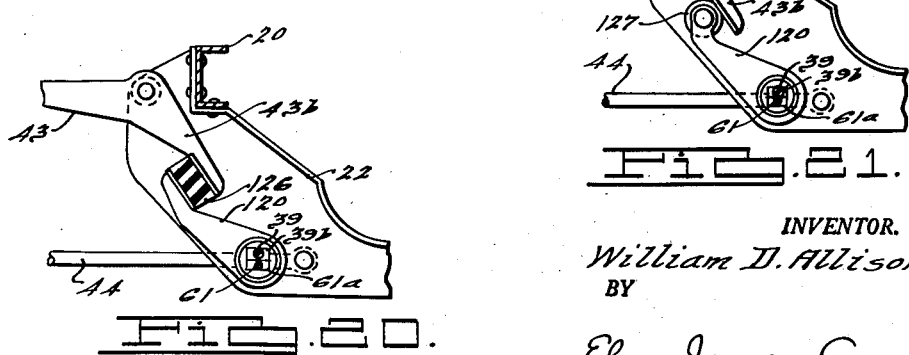
INVENTOR.
William D. Allison,
BY
Elmer Jamison Gray
ATTORNEY Patented Aug. 19, 1952

2,607,610

UNITED STATES PATENT OFFICE 2,607,610

SPRING SUSPENSION FOR MOTOR VEHICLES

William D. Allison, Detroit, Mich.

Application December 28, 1946, Serial No. 719,038

35 Claims. (Cl. 280—104)

This invention relates to motor vehicles and particularly to improvements in the spring suspensions therefor. The invention is applicable to various types of motor vehicles such as automobiles of the pleasure or passenger types, busses, trucks, ambulances and commercial vehicles. For the purposes of illustration the invention has been shown herein as embodied in a motor vehicle having a chassis adapted to be utilized in a passenger or pleasure type automobile.

One of the principal objects of the present invention is to provide a spring suspension for a motor vehicle capable of improving the riding characteristics of the vehicle, increasing the comfort of the driver and passengers especially when the vehicle travels over rough roads, and rendering the vehicle safer to handle over rough terrain while reducing materially serious stresses to which the frame is subjected in the use of motor vehicles, particularly those equipped with conventional spring suspensions.

Another important object of the invention is to provide a simplified and improved spring suspension especially advantageous for use in light cars, the invention enabling a light relatively cheap car to be produced which will have riding characteristics superior to those of conventional automobiles and which will enable the frame or body of the car to be maintained substantially level regardless of varying load conditions. The present spring suspension also has the important advantage of materially reducing or largely eliminating pitching and tossing of the vehicle and of greatly reducing body shake and vibration when the vehicle is travelling over rough roads.

Another object of the invention is to provide what may be termed a balanced spring suspension, preferably a torsional or torsion bar suspension common to the front and rear wheels of the vehicle at each side thereof, said suspension enabling much softer or lower rate springs to be utilized and being supplemented by spring means, preferably of the torsional kind, effective to vary the spring resistance at one end of the frame relative to the opposite end, means being provided for deflecting such spring means to compensate for relative changes in elevation of opposite ends of the frame due to variations in static load thereon. As a result of this feature of the invention it is possible to maintain the average effective riding height of the vehicle body substantially constant within the range of the load capacity of the springs regardless of whether the vehicle is empty or whether varying loads are carried thereby.

In accordance with the embodiment of the invention, herein illustrated by way of example, there is provided longitudinal torsional or torsion bar spring means connecting through the medium of front and rear lever arm means a pair of front and rear wheels at each side of the vehicle. The construction is such that the lever arm means for each front and rear wheel will torsionally deflect the spring means in opposed directions upon displacement of the wheels in corresponding vertical directions. Thus, when a front or rear wheel passes over a change in elevation, producing a raising or lowering effort at one end of the vehicle, a simultaneous and similar raising or lowering effort is applied at the opposite end of the vehicle. The action of the spring suspension, therefore, results in the simultaneous application of substantially equivalent vertical forces at opposite ends of the frame or body whenever the wheel or wheels at one end of the vehicle pass over a change in elevation. As a consequence, the vehicle rides substantially free of pitching and side sway. By thus providing spring means common to the front and rear wheels the suspension is what may be termed balanced, such suspension having the additional advantage of reducing greatly the spring rate at each wheel and affording increased riding comfort by producing the effect of very soft springs without the disadvantages consequent to their use in conventional spring suspensions.

Where the spring suspension is common to the front and rear wheels, as above described, a change in static or pay load at one end of the frame or body, such as the rear end, will effect a relative change in elevation of the front and rear of the frame. For example, the addition of passengers or baggage at the rear will lower the elevation of the rear of the frame and body and raise or elevate the front end. In accordance with the invention additional compensating spring means, preferably of the torsional or torsion bar kind, is provided at the rear or the front of the vehicle, or at both ends, for varying the spring resistance at one end of the vehicle relative to the opposite end. In addition, means is provided, such as power operated means, for independently deflecting the compensating spring means so as to compensate for relative changes in elevation of opposite ends of the frame and thereby levelize, or substantially so, the frame and cause the vehicle to ride substantially level or at an even keel.

Other objects of this invention will appear in the following description and appended claims, reference being had to the accompanying drawings forming a part of this specification wherein like reference characters designate corresponding parts in the several views.

Fig. 1 is a fragmentary plan view, partly in section, of a motor vehicle chassis provided with a spring suspension constructed in accordance with one embodiment of the present invention.

Fig. 2 is a side elevation of the structure shown in Fig. 1.

Fig. 3 is a vertical section taken substantially through lines 3—3 of Fig. 2 looking in the direction of the arrows.

Fig. 4 is a vertical section taken substantially through lines 4—4 of Fig. 2 looking in the direction of the arrows.

Fig. 5 is an enlarged detail view illustrating the connection of the torsion bars at the rear end of the vehicle.

Fig. 6 is a view in elevation of the rear wheel spring mechanism taken from the rear side thereof.

Fig. 7 is an enlarged section taken substantially through lines 7—7 of Fig. 1 looking in the direction of the arrows.

Fig. 8 is an enlarged plan view, partly in section, illustrating a modified construction in respect to the stabilizing torsion bars for the front end of the vehicle.

Fig. 9 is a sectional elevation taken substantially through lines 9—9 of Fig. 8 looking in the direction of the arrows.

Figure 10 is a view, generally similar to Fig. 1, illustrating a modified spring suspension.

Fig. 11 is a fragmentary elevation from lines 11—11 of Fig. 10 looking in the direction of the arrows.

Fig. 12 is a fragmentary plan view of the front end of a vehicle, this view being similar in part to Fig. 1 but illustrating a further modified construction.

Fig. 13 is an enlarged sectional view taken substantially through lines 13—13 of Fig. 12 looking in the direction of the arrows.

Fig. 14 is a fragmentary rear end view, partly in section, illustrating a further modification.

Fig. 15 is a section taken substantially through lines 15—15 of Fig. 14 looking in the direction of the arrows.

Fig. 16 is a view in part similar to Fig. 4 but illustrating a modified construction.

Fig. 17 is an enlarged section taken substantially through lines 17—17 of Fig. 16 looking in the direction of the arrows.

Fig. 18 is a view in part similar to Fig. 16 but illustrating a further modification.

Fig. 19 is an enlarged section taken substantially through lines 19—19 of Fig. 18 looking in the direction of the arrows.

Figs. 20 and 21 are views in part similar to Fig. 16 but illustrating further modifications.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

This application is a continuation-in-part of my application Serial No. 665,192, filed April 26, 1946.

In the drawings there are illustrated, by way of example, certain embodiments of the present invention as applied to a vehicle or automobile having pairs of front and rear wheels and a load carrying frame supported thereon through the medium of a spring suspension embodying the present invention. In the interest of clarity the vehicle superstructure or body, the power plant and power train have been omitted from the drawings. Although the front and rear wheels are shown as independently mounted through the medium of pairs of swinging suspension arms it will be understood that other types of wheel supports may be utilized without departing from the broader aspects of the invention. In this respect, therefore, the rear wheels or front wheels may be supported for vertical movement through the medium of any conventional types of axle means or supporting arms.

As illustrated in the drawings, the chassis or body frame is shown, by way of example, as comprising spaced longitudinal side sills or frame members 20 rigidly connected together by means of a main drop type front cross member 21 and a main drop type rear cross member 22. Adjacent the rear of the vehicle the frame sills are also rigidly connected together by means of a torque arm supporting cross member 23, and in advance of the front cross member 21 there is provided a cross member 24 rigidly secured to the frame sills. The front and rear wheels of the vehicle are indicated at 25 and 26 respectively.

As illustrated in Figs. 1 to 3 inclusive, each front wheel 25 is supported by upper and lower short and long suspension arms 27 and 28, each being of wish-bone construction. The upper and lower suspension or lever arms 27 and 28 are mounted at right angles to the longitudinal axis of the vehicle for swinging movement in a substantially vertical plane and are joined together at their outer ends by a spindle and king pin mounting 29 of any suitable type. The inner bifurcated ends of each upper suspension arm 27 carries a tubular member 30 extending through aligned apertures in the ends of the arm and welded thereto. Each tubular section is journalled in a bracket 31 rigidly secured to the cross member 21 and is provided with a square socket, as illustrated in Fig. 3, within which is fixed the square end 32a of a forwardly extending torsion bar 32. Each torsion bar 32 terminates at its front end in a square portion fixed within a square socket in a front mounting member 33 rigidly secured to one end of the cross member 24. The construction is preferably such that the socket member, to which the forward end of the torsion bar 32 is attached, is adjustable angularly to adjust the torsion bar to the desired initial torsion in either direction and thereafter locked in position.

From the foregoing construction it will be seen that a front end stabilizing or height adjusting torsion bar 32 is connected at its rear end to the inner end of each upper spring suspension arm 27 and is rigidly connected at its forward end to the frame cross member 24. Accordingly, up and down swinging motion of the suspension arms 27 about the longitudinal axes of the tubular members 30 will torsionally twist or deflect the torsion bars 32 which, as a consequence, will yieldingly resist up and down movement of the front wheels 25 one independently of the other.

The outer end of each upper suspension arm 27 is pivotally connected at 34 to a king pin mounting 35, the latter permitting the front wheel to be turned for steering purposes while enabling the suspension arm to swing in a vertical plane in accordance with vertical movements of the wheel.

The inner bifurcated ends of each lower suspension arm 28 are rigidly secured to a tubular member 36 which passes through aligned apertures in the ends of the arm and is welded thereto. Each tubular member 36 is journalled in depending brackets 37 riveted to the frame cross member 21 and is provided interiorly with a square socket 38 within which is fixed the square end 39a of a main torsion bar spring 39. The connection between the front end of the torsion bar 39 and the inner bifurcated ends of the lower suspension arm 28 is more particularly illustrated in Fig. 8.

The outer end of each lower suspension arm 28 is pivoted at 40 to the lower end of the spindle support 29 at the locality of the lower king pin mounting 41, this construction permitting steering motion of the front wheel 25 while enabling the lower suspension arm 28 to swing in a vertical plane consequent to up and down movement of the wheel. The pivotal connections between the inner and outer ends of the upper and lower front suspension arms preferably include rubber or flexible bearings as in my above identified application, filed April 26, 1946.

Steering control is provided at the front wheels 25 through the spindle and king pin mountings or supports 29 by steering mechanism, generally indicated at 42, arranged and mounted in front of the suspension arms 27, 28 and the cross frame member 21. This steering mechanism comprises a drag link 42a, tie rods 42b, steering arms 42c connected to the members 29, an idler arm 42d, a steering gear Pitman arm 42e, and associated joints, bearings and mountings including a steering column 42f.

In the present embodiment of the invention the rear wheels 26 are each supported for independent vertical movement by means of upper and lower swinging suspension arms or levers 43 and 44. The inner end of each upper suspension arm 43 is pivoted at 45 through the medium of a flexible or rubber bearing or bushing to a bracket 46 rigidly secured to the frame member 22. This frame member, as illustrated in Fig. 1, is in the present instance composed of two longitudinally spaced vertical plates 22a and 22b between which each bracket 46 extends. These plates 22a and 22b are centrally formed to receive the differential housing and are rigidly joined together along their top edges by means of a tie plate 22c. Each upper suspension arm 43 is in the form of a bell crank lever provided at its inner end with a vertically and downwardly extending crank arm 43a pivoted at its lower end at 47 through the medium of a flexible or rubber bearing or bushing to the outer end of a tension link 48. Each link extends outwardly between the plates 22a, 22b of the cross frame member 22 and is pivoted at its inner end at 49 through the medium of a flexible or rubber bearing or bushing to the upper end of a lever arm 50 also interposed between the frame plates 22a, 22b. Passing through the lower end of each lever arm 50 and rigidly secured thereto is a tubular member 51 journalled in the cross frame member 22 and provided with a longitudinally extending square socket 52 within which is fixed the rear square end 39b of one of the longitudinally extending main torsion bar springs 39.

From the foregoing construction it will be seen that the forward end of each main torsion bar spring 39 is rigidly anchored to the inner end of one of the front lower suspension arms 28 and the rear end is rigidly anchored to the lower end of one of the swinging lever arms 50.

The outer end of each upper suspension arm 43 is pivoted at 53 through the medium of a flexible or rubber bearing or bushing to the upper end of a rear wheel support and spindle member 54. Each lower suspension arm 44 is pivoted at its outer end at 55 to the lower end of the wheel support 54 through the medium of a flexible or rubber bearing or bushing. Similarly, the inner end of each lower suspension arm 44 is secured to a tubular member 56 which is journalled in the plates 22a, 22b through the medium of a flexible or rubber bearing or bushing.

It will be apparent from the foregoing that on vertical displacement of either rear wheel 26 the lateral control exercised by the bell crank 43 and connecting arm 44 is comparable to that exercised by the front upper and lower suspension arms 27 and 28 on the front wheels. It will also be apparent that all of the wheels of the vehicle will be independently sprung and each pair of front and rear wheels at each side of the chassis frame will be springably connected in common through the medium of one of the main torsion bar springs 39 which connects the lower suspension arm for the front wheel with the upper suspension arm for the rear wheel, the latter connection being accomplished through the medium of lever arm 50, tension link 48 and bell crank lever 43.

Referring particularly to Figs. 1 and 2, the rear wheels are controlled by means of parallel longitudinally extending torque arms 57 mounted to swing in vertical planes. Each torque arm is rigidly attached at its rear end to one of the rear wheel and spindle support members 54. The forward end of each torque arm 57 is pivotally connected at 58 to a bracket 59 rigidly secured to one end of the cross frame member 23, the pivotal connection at 58 being accomplished through the medium of a flexible or rubber bearing or bushing. The pivotal connections 58 between the torque arms and the brackets 59 provide a common transverse axis of swinging of the torque arms. These pivotal connections 58 constitute fulcrum points about which the arms swing in vertical planes consequent to up and down movements of the rear wheels and it will be noted that these fulcrum points are located above as well as forward of the axes 60 of the rear wheels. The transverse horizontal axis through the pivot or fulcrum points 58 preferably lies in a common plane intersecting both the common axes of the rear wheels and the center of gravity of the average vehicle weight. The elevated positions of the torque arm pivots 58 above the centers of the wheels are particularly desirable for vehicles having power applied through the rear wheels and eliminate the backward pitch of the vehicle on acceleration by applying a vertical force as well as a forward thrust to the vehicle frame. The net result on acceleration is for both ends of the vehicle frame to be slightly elevated without pitching. The lifting force applied on acceleration through the torque arms 57 at the rear of the vehicle compensates for the shift of weight from front to rear wheels and relieves the rear spring assembly from carrying this additional weight. On brake application in a vehicle moving in a forward direction a downward thrust is exerted on the frame by the torque arms 57 through the torque arm mountings on cross frame member 23.

In the present embodiment the torsion bars 39, which constitute the normal springing means for the vehicle, are supplemented by a torsion bar 61 at each side of the vehicle for the purpose of additionally springing the rear wheels and providing means for compensating for varying loads. These torsion bars 61, as in the case of bars 39, are selected as to cross-sectional size and torsional characteristics to suit the particular vehicle, and function to increase or decrease the spring resistance at the rear of the vehicle so as to compensate for relative changes in elevation of the front and rear ends of the vehicle and thereby maintain the vehicle at a substantially constant average riding height. The load compensating bars 61 are shown in the present embodiment for the rear end of the vehicle only since in present-day automobiles most of the additional passenger and baggage loads are concentrated at the rear. However, it will be understood that where loads are distributed substantially evenly to the front and rear wheels these bars may be duplicated for the front wheels and operated in the same manner as hereinafter described.

Each load compensating bar 61 is provided at its rear end with a flat sided or rectangular portion 61a fitting snugly within the square socket 52 against the flat sided end 39b of the bar 39, see Fig. 5. From this construction it will be apparent that swinging movement of the lever arm 50 resulting in turning of the tubular member 51 will impart corresponding turning movement to the ends 39b and 61a of each pair of torsion bars 39 and 61.

The front end of each load compensating bar 61, see Figs. 2 and 7, has a squared or flat sided portion 61b anchored within a correspondingly shaped socket in a tubular member 62 journalled in a pair of spaced depending angle brackets 63 riveted to the bottom flange of the chassis frame member 20. Fastened to the tubuler member 62 and disposed between the brackets 63 is a worm gear 64 meshing with a worm 65 secured to a cross shaft 66. This shaft, as shown in Figs. 1 and 7, extends transversely of the vehicle frame and has a worm 65 secured to each end thereof, each worm meshing with a worm gear 64. The shaft 66 is journalled at opposite ends in angle brackets 67 and 68 riveted to the chassis frame members 20. One end of the shaft 66 projects beyond the associated bracket 67 and is driven by a relatively small reversible electric motor 69 supported by a bracket 70. The electric motor 69 is automatically actuated in response to changes in static load on the rear of the vehicle by a switch mechanism and wiring circuits, not shown herein, but fully shown and described in my copending application Serial No. 757,579, filed June 27, 1947. Provision is thus made for operating the load compensating motor 69 in one direction or the other in order to increase or decrease the total load resistance of the spring suspension at the rear of the vehicle so as to compensate for increases or decreases in the pay load, such means being constructed, however, so as not to be influenced by mere temporary changes or by vertical motion of the rear wheels during travel of the vehicle. The load compensating controls for the motor 69, as shown and described in my said copending application, will only operate after a predetermined delay or interval of time, as it is only desirable that this occur when the pay load of the vehicle is increased or decreased over a relatively long period of time.

When the static load at the rear end of the vehicle is increased, as for example by the addition of passengers, the motor 69 will be actuated to drive the shaft 66 in one direction, thereby simultaneously driving the worm gears 64 in opposite directions and, as a consequence, imparting an angular twist to the squared ends 61b of the torsion bars 61. This will increase the torsional deflection and, hence the spring resistance of the torsion bars 61 to a point necessary to compensate for the additional load, and when the proper load compensation has been reached the motor 69 will be disconnected and the spring bars 61 will be maintained in their condition of increased torsional deflection. The reverse operation will occur when the pay load at the rear end of the vehicle is decreased, resulting in the operation of the motor 69 to unwind or decrease the torsional deflection of the spring bars 61.

When the vehicle is empty or without pay load, the main torsional bars 39 preferably function to maintain or support the vehicle at a given average or normal riding height, and in such case the compensating torsion bars 61 will be initially placed under very little or practically no torsion or twist. Under such conditions the fullest possible torsional resistance of the bars 61, through operation of the load compensating motor 69, may be added to the torsion bars 39 in order to compensate for varying increases in the pay or static load at the rear of the vehicle. Thus, it is possible for the present vehicle spring suspension to accommodate a pay or static load at least equal to the sprung weight of the vehicle while maintaining a substantially constant average riding height and a fully normal axle to frame clearance under no-load and full-load conditions. Extremely soft springs may thus be utilized, since under no conditions is it necessary to utilize springs which are heavier than necessary to carry the sprung loads regardless of whether the vehicle is empty or fully loaded. For example, the effective average spring rate, utilizing the spring suspension of the present invention, can be as low as approximately thirty pounds per inch per wheel as compared with conventional spring suspensions, utilizing either leaf or coil springs or a combination thereof, necessitating spring rates as high as one hundred and ten pounds per inch per wheel.

The main torsion bars 39 may be suitably guided and supported intermediate their ends at one or a plurality of points, as desired. In the present instance a tie bar 73 extends transversely of the vehicle frame and is secured at opposite ends to the frame members 20, see Figs. 1 and 7. Secured to this tie bar 73, at each end thereof, is a depending angle bracket 72 having an aperture to receive a rubber bushing 71 through which the torsion bar 39 extends. The rubber bushing permits torsional twisting or deflection of the bar 39 while also damping out vibrations thereof.

In the embodiment of Figs. 8 and 9 I have shown certain modifications in the construction of the front end stabilizing or height adjusting torsion bars. In this embodiment each such torsion bar 74 has, as in the case of the torsion bar 32, a flat sided or squared rear end 74a anchored within one of the tubular members 30 which in turn is rigidly secured to the inner bifurcated ends of the upper swinging suspension arm or lever 27. The bar 74 extends through a torsion tube 75 and is provided at its forward end with a flat sided or squared portion 74b anchored within a correspondingly shaped sleeve 77 mounted within and rigidly secured to the front end of the tube 75. The rear end of this tube is flanged and bolted at the locality of these flanges at 76 to the cross frame member 21. From this construction it will be readily seen that up and down swinging motion of the suspension arms or levers 27 will impart turning motion to the tubular members 30 and thereby torsionally twist or deflect the torsion bars 74. These bars in turn, through their connections with the front ends of the torsion tubes 75, will torsionally twist or deflect these tubes with the reaction effort of the tubes taken by the cross frame member 21. By thus utilizing the combined torsional resistance of the torsion bar 74 and torsion tube 75 it will be seen that the bar 74 may be considerably foreshortened and, in fact, may be approximately one-half as long as would otherwise be necessary in order to provide any given torsional resistance for the front end stabilizing or height adjusting bars.

In each of the embodiments hereinbefore described the height adjusting bars or elevation stabilizers 32 and 74, 75 for the front end of the frame or car are introduced into the spring suspension for the purpose of assuring average normal riding height for the front of the vehicle. Since extremely soft spring rates are possible at the front and rear wheels with the present torsion bar suspension, I have found it desirable to install the additional springing at the front wheels in order to maintain a normal average riding height of the front end under conditions such as when the front end tends to dip after a rapid or severe brake application or when the front end tends to raise or elevate excessively during rapid acceleration of the vehicle. The elevation stabilizer bars 32 or 74, 75 under normal conditions may be in unstressed condition, i. e. free of substantial torsional deflection, whereas the main torsion bars 39 will be normally deflected or twisted an amount sufficient to support the vehicle at the average riding height under no-load conditions. The stabilizer bars would, therefore, be twisted in one direction or the other throughout action of the suspension arms 27 to resist elevation or lowering of the front end, as a result of rapid acceleration of the vehicle or sudden application of the brakes, and will tend to maintain the desired average riding height at the front end.

These stabilizer torsion bars may, if desired, be utilized in addition for load compensating purposes in the same manner as the torsion bars 61 where it is desired, due to the construction of the vehicle, to compensate for substantial changes in the pay load or static load at the front end. In such instance the torsion bars 32 or 74 may be extended a suitable distance rearwardly of the cross frame member 21 and drivingly connected together for load compensating purposes by a reversible electric motor in the manner hereinafter described and illustrated in Figs. 12 and 13.

In the embodiment of Figs. 10 and 11 I have illustrated independent torsion bar springing for each of the front and rear wheels 25 and 26 of the vehicle together with load compensating mechanism applicable to the torsion bars for the purpose of compensating for variations in the pay or static load at either the front end or rear end of the vehicle, or both. The modified construction shown in Figs. 10 and 11 may be particularly adapted to vehicles, such as buses and trucks, where the load is more nearly equally distributed over the front and rear wheels, and of course it will be apparent that this mechanism is adapted for any vehicle where substantial increases or decreases in load occur at both ends of the vehicle.

Each front wheel 25 in the embodiment of Figs. 10 and 11 is provided with a main torsion bar spring 80 which at its rear end is anchored to the inner end of the lower suspension arm or lever 28 at the axis of turning thereof in the same manner as previously described and as particularly shown in Fig. 5. Each such torsion bar 80 has a square or flat sided rear end which is anchored within a correspondingly shaped socket in a bracket 81 fixed to one of the frame members 20. Thus, up and down swinging motion of the suspension arms 28 will independently torsionally twist or deflect the torsion bars 80. Each rear wheel 26 is also provided with a spring torsion bar 82 which is anchored in the same manner as previously described, and as particularly shown in Figs. 4 and 5, to the lower end of the swinging lever 50 at the axis of turning thereof. The front end of each torsion bar 82 is provided with a squared or flat sided portion which is anchored within a socket fixed within a bracket 83 secured to one of the frame members 20. Thus, up and down swinging motion of the rear suspension arms 43 will torsionally deflect or twist the bars 82.

In addition to the independent spring suspension bars 80 and 82 for the front and rear wheels, I provide, in the embodiment of Figs. 10 and 11, a load compensating spring suspension bar 84 for each front wheel and a load compensating spring suspension bar 85 for each rear wheel. The bars 84 have their front ends squared or flattened and anchored to the inner ends of the suspension arms 28 at the axis of turning thereof in the same manner as illustrated in Fig. 5. In like manner, each of the compensating bars 85 have their rear ends squared or flattened and anchored to the lower ends of the levers 50 at the axes of turning thereof in the same manner as illustrated in Fig. 5. The rear end of each bar 84 is anchored within a tubular sleeve 86 journalled within depending brackets 87 secured to one of the frame members 20. Fastened to each tubular sleeve 86 is a worm gear 88 driven by a worm 89 fastened to one end of a cross shaft 90 journalled at opposite ends in brackets secured to the frame member 20. The shaft 90 is driven by a load compensating reversible electric motor 91 in the same manner as previously described and as particularly shown in Fig. 7.

The front end of each load compensating torsion bar 85 is anchored within a tubular sleeve 92 journalled within brackets 94 secured to one of the frame members 20. Fastened to each sleeve 92 is a worm gear 93 driven by a worm 95 secured to one end of a cross shaft 96 journalled at opposite ends in brackets carried by the frame members 20. The shaft 96 is operated by means of a load compensating motor 97 in the same manner as previously described and as particularly shown in Fig. 7.

The operation of the load compensating torsion bars 84 and 85 is substantially the same as above described. The pair of front stabilizer bars 84 are controlled to compensate for variations in load at the front of the vehicle by the motor 91 which is automatically operated, similarly to the motor 69, to increase or decrease the twist or deflection of these bars to compensate for increases or decreases in loads at the front end of the vehicle. Similarly, the motor 97 is automatically operated to increase or decrease the twist or deflection of the torsion bars 85 in order to compensate for increases or decreases in loads at the rear end of the vehicle.

The embodiment of Figs. 10 and 11 thus provides independent torsion bar springing 80 and 82 for each of the front and rear wheels together with load compensating torsion bar spring mechanism 84 and 85 separately for the front and rear wheels. Other than the foregoing and the omission of the height adjusting or elevation stabilizers at the front end, the construction in Fig. 10 is the same as in the previous embodiment.

With reference to Figs. 1 to 6 inclusive, it will be seen that a change in elevation of either the front or rear wheels will produce a force or forces which will be transmitted to and absorbed by the torsion bar springs 39. Thus, if the left front wheel 25 in Fig. 3 passes over a bump or upward change in elevation, the torsion bar 39 connected to the lower suspension arm 28 will be twisted or angularly deflected in a clockwise direction, as viewed in Fig. 3. This torsional deflection of the spring bar will be transmitted directly to the lower end of the lever arm 50 shown at the left in Figs. 4 and 6, imparting a rotative motion in a clockwise direction, as viewed in these figures, to the lever arm 50. This rotative or turning effort exerted by the spring bar 39 on the lever arm 50 will place the link 48 in tension and exert a turning effort on the bell crank lever 43. As a consequence of this force applied to the bell crank lever, there will be a downward force applied to the wheel at pivot 53 of the bell crank and an upward component at the pivot 45 of the bell crank, this latter component tending to elevate the rear end of the vehicle. Similarly, the action of the front suspension arms 27 and 28, when the front wheel rises to pass over a change in elevation, will be to exert an effort at the inner pivotal axes of the suspension arms tending to elevate the front end of the vehicle. The reverse action to that above described will take place when either the front or rear wheel is depressed upon passing over a lower change in elevation during travel of the vehicle.

From the foregoing it will be seen that both front and rear ends of each torsion bar spring 39, in the embodiment of Figs. 1 to 6 inclusive, will be simultaneously deflected or twisted substantially corresponding amounts when the front and rear wheels successively pass over a change in elevation, resulting in substantially equivalent vertical movements being transmitted to opposite ends of the vehicle body and chassis. The torsion bar spring suspension, therefore, simultaneously imparts vertical forces in corresponding directions adjacent the front and rear of the vehicle body or frame in response to vertical motion of either a front or a rear wheel. As a consequence, the present spring suspension will tend to maintain the chassis and vehicle body substantially level regardless of vertical movements of the front and rear wheels. Of course, it will be understood that when the front and rear wheels are simultaneously elevated, both ends of the vehicle chassis and body will be raised substantially equal distances. When one front wheel is elevated and a rear wheel is lowered simultaneously, assuming the distances of elevation are equal, there will be substantially no change in lift to the vehicle sprung weight. It is important to note that the total vertical force due to a change in elevation of either front or rear wheel at one side of the vehicle is absorbed by and divided equally between the front and rear of the interconnecting torsion bar. Thus, the average spring rate of the present spring suspension will be approximately one-half of the spring rate of a conventional automobile.

The provision of the bell crank levers 43, links 48 and levers 50 at the rear end of the vehicle enable the opposite ends of each torsion bar 39 to be deflected or twisted in opposite directions when, for example, the front and rear wheels at corresponding sides of the vehicle are elevated or depressed at the same time. Hence, corresponding upward or downward movements of the front and rear suspension arms operate to torsionally deflect the opposite ends of the torsion bars 39 in opposite directions.

It will be noted in Figs. 1 and 10 that the upper suspension arms or levers 43 are arranged in a common vertical plane somewhat in advance of the lower suspension arms or levers 44. This construction not only has the advantage of resisting lateral twisting of the rear wheels 26 but also provides clearance for the driving shafts for the rear wheels, enabling the drive to be transmitted to these wheels without interference with the levers 50 and links 48.

The embodiment of the invention illustrated in Figs. 12 and 13 corresponds substantially to the embodiment of Figs. 1 to 7 inclusive, differing therefrom in that the front end stabilizer torsion bars 32 are extended rearwardly of the cross frame member 21 and are drivingly connected together for load compensating purposes, thereby enabling the front end of the vehicle to be maintained at an average riding height under varying load conditions. In this embodiment the torsion bars 32 are extended rearwardly of the squared portions 32a (which are anchored to the arms 27) as shown at 32b and the ends of these extensions are upset or squared at 32c and each anchored within a worm gear 100 axially thereof. Meshing with each worm gear is a worm 101 fastened to each end of a cross shaft 102. This shaft is rotatably supported in any suitable manner and in the present instance is journalled at opposite ends within the lower ends of brackets 103 secured to angle brackets 104 attached to the frame sills 20 and projecting outwardly therefrom. The shaft 102 at one side has an axial extension drivingly connected to a reversible electric motor 105 carried by the bracket 104. As in the embodiments of Figs. 7 and 11 the pairs of worms and worm gears 100, 101 at opposite ends of the shaft 102 are formed, respectively, with right and lefthand teeth so that when the motor 105 is operated in one direction or the other the torsion bars 32 and their extensions 32b at opposite sides of the vehicle will be twisted or torsionally deflected in opposite directions. The compensating motor 105, as in the case of the motors 69, 91 and 97, is automatically actuated in response to changes in static load on the vehicle by a delayed action switch mechanism and wiring circuits. Thus, as the front end of the vehicle is lowered by an increase in static load the motor 105 will be actuated to drive the gearing 100 and 101 to increase the torsional resistance of the bars 32 and thereby raise the vehicle to its proper average riding height. The reverse will also occur when the static load is reduced at the front end of the vehicle.

As described above, the rear wheels may be independently sprung while at the same time having provision for load compensation at the rear of the vehicle. Such a construction is illustrated in the embodiment of Figs. 14 and 15 wherein the torsion bars 82 in the embodiment of Figs. 10 and 11 are dispensed with and coil springs utilized in lieu thereof. In the embodiment of Figs. 14 and 15 the rear wheels are independently sprung. As illustrated, each torque arm 57 carries an inwardly projecting seat 106 for receiving and confining the lower end of a coil spring 107 positioned at a rearward inclination substantially at right angles to the major axis of the torque arm. The upper end of each spring 107 is seated and confined within an extension 108a of a cross frame member 108 rigidly secured to the cross frame member 22. A conventional telescopic type shock absorber is preferably mounted within the coils of each spring 107 and interposed between the seats 106 and 108a for the spring.

Each rear wheel is provided with upper and lower, short and long swinging suspension arms or links 110 and 111 which are pivoted at their outer ends at 112 and 113, respectively, to the upright wheel support or spindle bracket 114. The inner end of each upper suspension arm 110 is pivoted at 115 to a bracket 116 carried by the cross frame member 22, and the inner end of each lower suspension arm 111 is pivoted at its inner end at 117 to the frame member. The pivotal connections at opposite ends of the suspension arms preferably include yieldable rubber bushings in order to permit a small amount of universal movement during operation of the vehicle.

Load compensating means is provided for the rear end of the vehicle in the embodiment of Figs. 14 and 15, and this mechanism may take the form illustrated in the embodiment of Figs. 1 to 7 inclusive, differing therefrom in that the rear squared ends 61c of the load compensating bars 61 are anchored within the inner ends of the lower suspension arms 111 so that vertical motion of these arms will torsionally deflect the bars 61 at the pivotal axes of turning 117 of these arms. The operation of the load compensating mechanism, as applied to the inner ends of the suspension arms 111, is the same as previously described.

In the embodiment of Figs. 16 to 21 inclusive I have illustrated various means for operatively connecting the upper suspension arms 43 at the rear of the vehicle with the lever arms which are attached to the rear ends of the torsion bars 39 and 61 whereby the links 48 are dispensed with. These embodiments, therefore, provide in effect a direct operative connection between each suspension arm 43 and the lever 50 of the embodiment of Fig. 4 with the consequent elimination of the link 48.

Referring to Figs. 16 and 17, a lever arm 120 is attached at its lower end to the upset or squared ends 39b and 61a of the torsion bars 39 and 61 in the same manner as the lever arm 50 is attached thereto. The lever 120 extends upwardly and outwardly at a normal angle of approximately 45° and carries at its outer end a hardened steel semi-spherical ball 122 slidable within a socket or groove 121a in a shoe 121 of bronze or other bearing metal attached to the lower end of a crank arm 43b extending integrally and at approximately an angle of 45° from the upper suspension arm 43. It will be understood that the construction shown in Figs. 16 and 17 is provided at each side of the vehicle at the rear end thereof, and it will be apparent that upward movement of the wheel will cause the crank arm 43b to impart turning movement to the lever arm 120 and thereby torsionally twist the bars 39 and 61. Since these bars are initially twisted, when installed, they will at all times exert turning effort on the lever arm 120 thereby maintaining the bearing portions 121 and 122 constantly in engagement during all operating conditions.

In the embodiment of Figs. 18 and 19 the lever arm 125, which corresponds to the lever arm 120, is pressed into channel shape from sheet steel and is formed at its outer end with a curved pressed semi-spherical ball portion 125a slidable within a correspondingly shaped socket or groove 124a in a bearing block or shoe 124 rigidly secured to a reinforcing plate 123 mounted within a channel shaped extension 43c of the suspension arm 43, the latter being pressed from sheet steel in this instance. The lever arm 125 at each side of the vehicle at the rear end thereof is attached at its lower end to the ends 39b and 61a of the torsion bars 39 and 61 in the same manner as the lever arms 50 and 120. The operation of the modified construction shown in Figs. 18 and 19 is the same as that described above in connection with the embodiment of Figs. 16 and 17.

The embodiments of Figs. 20 and 21 are the same as the embodiment of Figs. 16 and 17 with the exception of the operative connection between the crank arm 43b and the lever arm 120. In Fig. 20 this connection takes the form of a resilient or elastic rubber block 126 interposed between the adjacent ends of the crank arm 43b and lever arm 120, this rubber block being vulcanized thereto and, hence, yielding to the desired extent during pivotal motion of the suspension arm 43 and lever arm 120 consequent to vertical movement of the rear wheel. In the embodiment of Fig. 21, on the other hand, the operative connection between the adjacent ends of the crank arm 43b and lever arm 120 takes the form of a roller 127 journalled in a bifurcated portion at the upper end of the lever arm 120 and having rolling engagement with a flat hardened bearing surface on the lower end of the crank arm 43b.

I claim:

1. In a spring mechanism for a vehicle having pairs of transversely spaced front and rear wheels and a frame, a longitudinal torsion bar connected to each wheel of one pair and extending longitudinally to points intermediate said pairs of wheels, a gear attached to each bar, a transverse shaft supported by the frame intermediate said pairs of wheels drivingly connected to said gears, and means for turning said shaft to actuate said gears and torsionally deflect said bars thereby to compensate for variations in static load on said frame.

2. In a spring mechanism for a vehicle having transversely spaced front and rear wheels, a longitudinal torsion bar connected to each wheel, a gear attached to each bar, a transverse shaft drivingly connected to each front and rear pair of gears, and means for turning said shafts to actuate said gears and torsionally deflect said bars thereby to compensate for variations in static load on the frame.

3. In a spring mechanism for a vehicle having transversely spaced front and rear wheels, a longitudinal torsion bar connected to each wheel, a gear attached to each bar, a transverse shaft drivingly connected to each front and rear pair of gears and supported by the frame intermediate said front and rear wheels, and separate motor means for independently turning said shafts to actuate said gears and torsionally deflect said bars thereby to compensate for variations in static load on opposite ends of the frame.

4. In a vehicle having a frame structure and longitudinally spaced pairs of front and rear wheels, a longitudinally extending torsion bar for each wheel, means for varying the resistance of the torsion bars for the front wheels independently of the torsion bars for the rear wheels, and means for varying the resistance of the torsion bars for the rear wheels independently of the torsion bars for the front wheels, each of said means being automatically responsive to changes in static load on the frame structure.

5. In a spring suspension for a vehicle having a frame and front and rear longitudinally spaced wheels at the same side of the frame, lever arm means connected to each wheel and also connected to the frame at longitudinally spaced localities, longitudinal torsional spring means connecting said lever arm means and operative thereby to transmit vertical forces in corresponding directions to the front and rear of the frame in response to vertical motion of either wheel, torsional spring means connected to one wheel and operative independent of the other wheel, and means operatively connected to said last named spring means to deflect the same and thereby increase or decrease the spring resistance at one end of the frame relative to the opposite end of the frame to compensate for varying load conditions at said one end of the frame.

6. In a spring suspension for a vehicle having a frame and front and rear longitudinally spaced wheels at the same side of the frame, lever arm means connected to each wheel and also connected to the frame at longitudinally spaced localities, longitudinal torsional spring means connecting said lever arm means and operative thereby to transmit vertical forces in corresponding directions to the front and rear of the frame in response to vertical motion of either wheel, torsional spring means connected to one wheel and operative independent of the other wheel for increasing the spring resistance at one end of the frame relative to the opposite end of the frame thereby to compensate for varying load conditions at said one end of the frame, and power operated means operatively connected to said last named spring means and responsive to changes in elevation of one end of the frame relative to the opposite end of the frame for deflecting said second named torsional spring means.

7. In a spring suspension for a vehicle having a frame and front and rear longitudinally spaced wheels at the same side of the frame, lever arm means connected to each wheel and also connected to the frame at longitudinally spaced localities, longitudinal torsional spring means connecting said lever arm means and operative thereby to transmit vertical forces in corresponding directions to the front and rear of the frame in response to vertical motion of either wheel, additional spring means connected to one wheel for varying the spring resistance at one end of the frame relative to the opposite end of the frame, and means operatively connected to said last named spring means and responsive to changes in elevation of one end of the frame relative to the opposite end of the frame for deflecting said last named spring means thereby to compensate for said relative changes in elevation.

8. In a spring suspension for a vehicle having a frame and front and rear longitudinally spaced wheels at the same side of the frame, lever arm means connected to each wheel and also connected to the frame at longitudinally spaced localities, longitudinal torsional spring means connecting said lever arm means and operative thereby to transmit vertical forces in corresponding directions to the front and rear of the frame in response to vertical motion of either wheel, additional spring means connected to one wheel for varying the spring resistance at one end of the frame relative to the opposite end of the frame, and delayed action power operated means operatively connected to said last named spring means and responsive to changes in elevation of one end of the frame relative to the opposite end of the frame for deflecting said last named spring means to compensate for said relative changes in elevation.

9. In a spring suspension for a vehicle having a frame and rear wheels at a side of the frame, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, said front and rear lever arm means including lever arms extending from said pivotal connections in the same directions, torsional spring means connected to one of said wheels adjacent one end of the frame and being independent of the other, and means operatively connected to said last named spring means to deflect the same thereby to vary the spring resistance at said one end of the frame.

10. In a spring suspension for a vehicle having a frame and front and rear wheels at a side of the frame, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, said front and rear lever arm means including lever arms extending from said pivotal connections in the same directions, torsional spring means connected to one of said wheels adjacent one end of the frame and being independent of the other and operable to vary the spring resistance at said one end of the frame, and power operated means operatively connected to said last named spring means and responsive to relative changes in elevation of opposite ends of the frame for deflecting said last named torsional spring means.

11. In a spring suspension for a vehicle having a frame and front and rear wheels at a side of the frame, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, said front and rear lever arm means including lever arms extending from said pivotal connections in the same directions, additional spring means connected to one wheel for varying the spring resistance at one end of the frame relative to the opposite end of the frame, and means operatively connected to said last named spring means and responsive to changes in elevation of one end of the frame relative to the opposite end of the frame for deflecting said last named spring means to compensate for said relative changes in elevation.

12. In a spring suspension for a vehicle having a frame and front and rear wheels at a side of the frame, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, said front and rear lever arm means including lever arms extending from said pivotal connections in the same directions, additional spring means connected to each wheel for varying the spring resistance at each end of the frame relative to the opposite end of the frame, and means operatively connected to each of said last named spring means and responsive to changes in elevation of one end of the frame relative to the opposite end of the frame for independently deflecting each of said last named spring means to compensate for said relative changes in elevation.

13. In a spring suspension for a vehicle having a frame and front and rear wheels at a side of the frame, front and rear swinging lever arm means pivotally connected to the frame and extending from the pivotal connections thereof to the frame in corresponding directions and connected to said wheels, longitudinal torsional spring means common to the front and rear wheels and connected to one of said lever arm means for torsional deflection thereof, means for operatively connecting the other lever arm means to said spring means to cause said front and rear lever arm means when swinging in corresponding directions to torsionally deflect said spring means in opposite directions thereby to displace the front and rear of the frame in corresponding vertical directions upon vertical displacement of the front wheel or the rear wheel, spring means connected to one wheel and operative independent of the other wheel, and means operatively connected to said last named spring means and acting thereon to vary the spring resistance at said one wheel.

14. In a spring suspension for a vehicle having a frame and front and rear wheels at a side of the frame, front and rear swinging lever arm means pivotally connected to the frame and extending from the pivotal connections thereof to the frame in corresponding directions and connected to said wheels, longitudinal torsional spring means common to the front and rear wheels and connected to one of said lever arm means for torsional deflection thereof, means for operatively connecting the other lever arm means to said spring means to cause said front and rear lever arm means when swinging in corresponding directions to torsionally deflect said spring means in opposite directions thereby to displace the front and rear of the frame in corresponding vertical directions upon vertical displacement of the front wheel or the rear wheel, spring means connected to one wheel and operative independent of the other wheel for varying the spring resistance at said one wheel, and power operated means operatively connected to said last named spring means and responsive to changes in elevation of one end of the frame relative to the opposite end of the frame due to variations in static load thereon and acting on said last named spring means to deflect the same thereby to vary the spring resistance at one end of the frame relative to the opposite end of the frame.

15. In a spring suspension for a vehicle having a frame and front and rear wheels at a side of the frame, front and rear swinging lever means including lever arms pivotally connected to the frame and extending from the pivotal connections thereof transversely of the frame and connected to said wheels, longitudinal spring means common to the front and rear wheels and connected to said front and rear lever means and effective to displace the front and rear of the frame in corresponding vertical directions upon vertical displacement of the front wheel or the rear wheel, additional spring means connected to one wheel and operative independent of the other, and means operatively connected to and acting on said additional spring means to deflect the same in response to changes in elevation of one end of the frame relative to the opposite end of the frame thereby to vary the spring resistance at one end of the frame relative to the opposite end.

16. In a spring suspension for a vehicle having a frame and front and rear wheels at a side of the frame, front and rear swinging lever means including lever arms pivotally connected to the frame and extending from the pivotal connections thereof in corresponding directions and connected to said wheels, longitudinal spring means common to the front and rear wheels and connected to said front and rear lever means and effective to displace the front and rear of the frame in corresponding vertical directions upon vertical displacement of the front wheel or the rear wheel, additional spring means connected to one wheel for varying the spring resistance at one end of the frame relative to the opposite end of the frame, and means operatively connected to said last named spring means and responsive to changes in elevation of one end of the frame relative to the opposite end of the frame for deflecting said last named spring means to compensate for said relative changes in elevation.

17. In a spring suspension for a vehicle having a frame and front and rear wheels at a side of the frame, front and rear swinging lever means including lever arms pivotally connected to the frame and extending from the pivotal connections thereof in corresponding directions and connected to said wheels, longitudinal spring means common to the front and rear wheels and connected to said front and rear lever means and effective to displace the front and rear of the frame in corresponding vertical directions upon vertical displacement of the front wheel or the rear wheel, additional spring means connected to one wheel for varying the spring resistance at one end of the frame relative to the opposite end of the frame, and delayed action power operated means operatively connected to said last named spring means and responsive to changes in elevation of one end of the frame relative to the opposite end of the frame for deflecting said last named spring means to compensate for said relative changes in elevation.

18. In a spring suspension for a vehicle having a frame and front and rear wheels at a side of the frame, front and rear swinging lever arms pivotally connected to the frame and extending from the pivotal connections thereof transversely of the frame and connected to said wheels, longitudinal torsional spring means common to the front and rear wheels and connected to one of said lever arms for torsional deflection thereby, means including a swinging lever for operatively connecting the other lever arm to said spring means to cause said lever arms when swinging in corresponding directions to torsionally deflect said spring means in opposite directions thereby to displace the front and rear of the frame in corresponding vertical directions upon vertical displacement of the front wheel or the rear wheel, spring means connected to one wheel and independent of the other wheel for varying the spring resistance at said one wheel, and means to deflect said last named spring means in response to changes in static load on the frame.

19. In a spring suspension for a vehicle having a frame and front and rear wheels at a side of the frame, front and rear swinging lever arms pivotally connected to the frame and extending from the pivotal connections thereof to the frame in corresponding directions and connected to said wheels, longitudinal torsional spring means common to the front and rear wheels and connected to one of said lever arms for torsional deflection thereby, a swinging lever connected to said spring means and a link connecting said lever to said other lever arm thereby to cause said lever arms when swinging in corresponding directions to torsionally deflect said spring means in opposite directions thereby to displace the front and rear of the frame in corresponding vertical directions upon vertical displacement of the front wheel or the rear wheel, additional spring means connected to a wheel, and mechanism operatively connected to said last named spring means and acting thereon to vary the spring resistance at one end of the frame relative to the opposite end of the frame upon relative changes in elevation of opposite ends of the frame.

20. In a vehicle having a frame and front and rear wheels, front and rear swinging lever means pivotally connected to the frame and connected to said wheels, a spring suspension common to said wheels and extending longitudinally of the frame and connected to said front and rear lever means and operative to displace opposite ends of the frame in corresponding directions upon vertical motion of a front wheel or a rear wheel, and means for levelizing said frame upon relative changes in elevation of opposite ends thereof due to changes in static load on the frame, said last named means comprising compensating spring means additional to said spring suspension for varying the spring resistance at one end of the frame relative to the opposite end of the frame and automatically operated means operatively connected to said compensating spring means and responsive to changes in elevation of one end of the frame relative to the opposite end for varying the spring resistance of said compensating spring means to compensate for said relative changes in elevation.

21. A structure as set forth in claim 20 wherein said spring suspension comprises torsional spring means and said compensating spring means includes a torsion spring connected to one of said wheels.

22. In a vehicle having a frame and two longitudinally spaced wheels, torsional spring means extending longitudinally of the frame for yieldingly supporting the frame on said wheels, lever arm means connected to said frame and to said spring means adjacent each of said wheels and responsive to vertical displacement thereof to deflect said spring means and thereby simultaneously impart vertical forces in corresponding directions to opposite ends of the frame, and spring means connected to one of said wheels and independent of the other, and means operatively connected to and acting on said last named spring means to deflect the same and thereby vary the spring resistance at one end of the frame relative to the opposite end of the frame to compensate for relative changes in elevation of opposite ends of the frame.

23. A structure as set forth in claim 22 wherein said last named spring means includes a spring torsion bar, said structure including a gear attached to said torsion bar, and a reversible electric motor responsive to a change in elevation of one end of the frame for driving said gear to torsionally deflect said torsion bar.

24. In a spring suspension for a vehicle having a frame and front and rear wheels at a side of the frame, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, torsional spring means connected to one wheel and independent of the other wheel, and power driven means operatively connected to said last named spring means for torsionally deflecting the same thereby to vary the spring resistance at said one wheel relative to the other wheel.

25. In a spring suspension for a vehicle having a frame and front and rear wheels at a side of the frame, front and rear swinging lever arm means connected to said wheels, longitudinal torsional spring means common to said wheels and connecting said front and rear lever arm means and operative thereby to displace the front and rear of the frame in corresponding directions upon vertical displacement of either wheel, torsional spring means connected to one wheel independently of the other, and means operatively connected to said last named spring means and acting thereon to torsionally deflect the same thereby to vary the spring resistance at said one wheel.

26. A structure as set forth in claim 25 wherein said last named torsional spring means has less effective resistance to wheel displacement than said first named torsional spring means.

27. In a spring suspension for a vehicle having a frame and front and rear wheels at a side of the frame, front and rear swinging lever arm means pivotally connected to the frame, longitudinal torsional spring means common to the front and rear wheels and connecting said lever arm means at the localities of the pivotal connections thereof to the frame, means for connecting each lever arm means to a wheel, said lever arm means being effective to torsionally deflect said spring means in opposite directions thereby to displace the front and rear of the frame in corresponding vertical directions upon vertical displacement of either wheel, spring means connected to one wheel and independent of the other wheel, and means operatively connected to said last named spring means and acting thereon to deflect the same thereby to vary the spring resistance at said one wheel, said last named spring means having less effective resistance to wheel displacement than said torsional spring means.

28. In a spring suspension for a vehicle having a frame and front and rear wheels at a side of the frame, front and rear swinging lever arm means pivotally connected to the frame and connected to said wheels, longitudinal torsional spring means common to said wheels and connecting said front and rear lever arm means at the localities of the pivotal connections thereof to the frame and operative by said lever arm means to displace the front and rear of the frame in corresponding directions upon vertical motion of a front wheel or a rear wheel, spring means connected to one wheel adjacent one end of the frame and being independent of the other wheel, power operated means for deflecting said last named spring means to vary the spring resistance at one end of the frame to compensate for varying static load conditions, and yieldable means acting against vertical displacement of the wheel at the opposite end of the frame and being independent of said second named spring means for varying the spring rate at said last named wheel.

29. A structure as set forth in claim 20 wherein yieldable means acting against vertical displacement of a front wheel is provided and being independent of said compensating spring means for varying the spring rate at said front wheel, and wherein said compensating spring means is provided for the rear of the frame.

30. In a vehicle having a vehicle structure and front and rear wheels, a spring suspension common to said front and rear wheels and extending therebetween longitudinally of the vehicle structure, separate means operatively connecting said suspension to each wheel and acting on said suspension to effect displacement of opposite ends of the vehicle structure in corresponding directions upon vertical motion of a front wheel or a rear wheel, load compensating spring means connected to one wheel and being independent of the other wheel, power actuated means operative in opposite directions and responsive to a change in elevation of one end of the vehicle structure relative to the opposite end, and means operatively connecting said power actuated means to said load compensating spring means and acting on the latter to deflect the same in one direction or the other thereby to vary the spring resistance at one end of the vehicle structure to compensate for changes in static load thereon.

31. A structure as set forth in claim 30 wherein said spring suspension and said load compensating spring means each includes a torsional spring.

32. A structure as set forth in claim 30 wherein yieldable means acting against vertical displacement of a front wheel is provided and being independent of said compensating spring means for varying the spring rate at said front wheel and wherein said load compensating spring means is provided for the rear wheel.

33. A structure as set forth in claim 30 wherein the means connecting the spring suspension to each wheel includes up and down swinging lever arms pivotally connected to the vehicle structure and connected to said suspension at the localities of the pivotal connections thereof to the vehicle structure.

34. In a vehicle having a vehicle structure and front and rear wheels, a spring suspension common to said front and rear wheels and extending therebetween longitudinally of the vehicle structure, separate means operatively connecting said suspension to each wheel and acting on said suspension to effect displacement of opposite ends of the vehicle structure in corresponding directions upon vertical motion of a front wheel or a rear wheel, load compensating spring means connected to one wheel, power actuated means responsive to a change in elevation of one end of the vehicle structure relative to the opposite end, and means operatively connecting said power actuated means to said load compensating spring means and acting on the latter to deflect the same thereby to vary the spring resistance at one end of the vehicle structure.

35. A structure as set forth in claim 34 wherein the means operatively connecting said suspension to one wheel comprises upper and lower swinging lever arms and lever means connected to said suspension and operatively connected to said upper lever arm.

WILLIAM D. ALLISON.

REFERENCES CITED

The following references are of record in the file of this patent:

UNITED STATES PATENTS

| Number | Name | Date |
|---|---|---|
| 1,396,549 | Beatty | Nov. 8, 1921 |
| 2,075,041 | Kliesrath | Mar. 30, 1937 |
| 2,099,819 | Mercier | Nov. 23, 1937 |
| 2,103,590 | Lefevre | Dec. 28, 1937 |
| 2,191,211 | Krotz | Feb. 20, 1940 |
| 2,490,311 | Rostu | Dec. 6, 1949 |
| 2,563,261 | Montrose-Oster | Aug. 7, 1951 |

FOREIGN PATENTS

| Number | Country | Date |
|---|---|---|
| 86,257 | Austria | Nov. 10, 1921 |
| 182,233 | Switzerland | Apr. 16, 1936 |
| 767,598 | France | July 20, 1934 |
| 828,405 | France | May 18, 1938 |